United States Patent
Kim (10) Patent No.: US 8,874,078 B2
(45) Date of Patent: Oct. 28, 2014

(54) METHOD OF UNLOCKING IN STAGES IN MOBILE TERMINAL AND MOBILE TERMINAL FOR THE SAME

(71) Applicant: Samsung Electronics Co., Ltd., Gyeonggi-do (KR)

(72) Inventor: Jae-Ho Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 90 days.

(21) Appl. No.: 13/747,064

(22) Filed: Jan. 22, 2013

(65) Prior Publication Data

US 2013/0189952 A1 Jul. 25, 2013

(30) Foreign Application Priority Data

Jan. 19, 2012 (KR) .................. 10-2012-0006327

(51) Int. Cl.
| | |
|---|---|
| *H04W 12/12* | (2009.01) |
| *H04W 12/00* | (2009.01) |
| *H04W 12/06* | (2009.01) |
| *H04L 29/06* | (2006.01) |
| *H04W 88/02* | (2009.01) |

(52) U.S. Cl.
CPC .............. *H04W 12/00* (2013.01); *H04W 88/02* (2013.01); *H04W 12/06* (2013.01); *H04L 63/0846* (2013.01); *H04L 2463/082* (2013.01)
USPC ......................................... 455/410; 455/411

(58) Field of Classification Search
CPC ............. H04L 63/0846; H04W 12/06; H04W 2463/082
See application file for complete search history.

(56) References Cited

U.S. PATENT DOCUMENTS

| | | | | |
|---|---|---|---|---|
| 6,801,765 | B1 * | 10/2004 | Roo et al. ...................... | 455/411 |
| 7,231,231 | B2 * | 6/2007 | Kokko et al. .................. | 455/566 |
| 2005/0154935 | A1 | 7/2005 | Jin | |
| 2007/0164848 | A1 | 7/2007 | Kim | |
| 2010/0167693 | A1 | 7/2010 | Yamada | |
| 2010/0269040 | A1 | 10/2010 | Lee | |

FOREIGN PATENT DOCUMENTS

| | | |
|---|---|---|
| KR | 1019970009461 | 2/1997 |
| KR | 100662701 | 1/2007 |
| KR | 1020100053144 | 5/2010 |

\* cited by examiner

*Primary Examiner* — Nathan Mitchell
*Assistant Examiner* — Dung Lam
(74) *Attorney, Agent, or Firm* — The Farrell Law Firm, P.C.

(57) ABSTRACT

Methods and apparatus are provided for unlocking in stages in a mobile terminal. An amount of time since setting a locking mode is counted. An unlocking command is received from a user. A locking stage is determined based on the amount of time from among a plurality of locking stages. An unlocking command of the determined locking stage and the received unlocking command are compared. The locking mode is released when the unlocking command in the determined locking stage is identical to the received unlocking command.

17 Claims, 8 Drawing Sheets

METHOD OF UNLOCKING IN STAGES IN MOBILE TERMINAL AND MOBILE TERMINAL FOR THE SAME

PRIORITY

This application claims priority under 35 U.S.C. §119(a) to a Korean Patent Application filed in the Korean Intellectual Property Office on Jan. 19, 2012 and assigned Serial No. 10-2012-0006327, the contents of which are incorporated herein by reference.

BACKGROUND OF THE INVENTION

1. Field of the Invention

The present invention relates generally to an unlocking method and apparatus in a mobile terminal, and more particularly, to a method and an apparatus for controlling an unlocking stage of a mobile terminal.

2. Description of the Related Art

Various User Interfaces (UIs) and various functions using the UIs are available for use in a mobile terminal.

A mobile terminal equipped with a touch screen includes an input device locking/unlocking function in order to restrict unnecessary input errors while the mobile terminal is in an idle state, or to prohibit another user from using the mobile terminal. A mobile terminal generally performs a locking function when a user selects activation of the locking function. A user may set a locking function of the mobile terminal by selecting a locking manner, such as, for example, a pattern, a Personal Identification Number (PIN), or a password.

A locking function may be activated, when input is not provided from a user for a predetermined time in a mobile terminal in which the locking function is set. Accordingly, when a user does not provide input for the predetermined time using a specific function of the mobile terminal, a screen or a function of the mobile terminal becomes deactivated. In order to release a locking mode, such as, for example, a hold state of a touch screen, a general mobile terminal releases the locking mode when a user-predefined password is input.

As described above, the mobile terminal activates the locking function whenever a predetermined time of waiting for input has passed. For example, when a user surfs the web using a mobile terminal, the user may not provide a key input for a predetermined time when reading searched contents. Even though the user is using a function of the mobile terminal, the mobile terminal determines that no input has been made and deactivates a screen and the function of the mobile terminal. Accordingly, in order to activate the currently used function, the user must repetitively release the locking function according to a method set by the user. The process of releasing the locking function may be inconvenient to a user, according to a frequency of the unlocking or an unlocking method. For example, when a standby time of a mobile terminal is short, a user must frequently input a password or a pattern in order to release the locking function.

When a user sets a complex password or pattern for security enhancement of the mobile terminal, a user must endure greater inconvenience compared to the releasing of the locking function by using a simple password or pattern. On the contrary, when a user sets a simple password or pattern, there are concerns of exposure of the password or pattern to a third person, or stealing of the password or pattern, thereby causing a security problem.

SUMMARY OF THE INVENTION

The present invention has been made to address at least the above problems and/or disadvantages and to provide at least the advantages described below. Accordingly, an aspect of the present invention provides a method and an apparatus for more conveniently releasing a locking function of a mobile terminal.

Another aspect of the present invention provides a method and an apparatus for controlling a locking function of a mobile terminal in stages so as to provide a security level desired by a user.

In accordance with an aspect of the present invention, a method of unlocking in stages in a mobile terminal is provided. An amount of time since setting a locking mode is counted. An unlocking command is received from a user. A locking stage is determined based on the amount of time from among a plurality of locking stages. An unlocking command of the determined locking stage and the received unlocking command are compared. The locking mode is released when the unlocking command in the determined locking stage is identical to the received unlocking command.

In accordance with another aspect of the present invention, a method of unlocking in stages in a mobile terminal is provided. An unlocking command of a predetermined code value is received. A locking state of the mobile terminal is released according to the unlocking command. A user input standby time is counted. A state of the mobile terminal is converted to a re-locking state when the user input standby time exceeds a predetermined time. A part of the predetermined code value corresponding to the unlocking command is received. The locking state of the mobile terminal is released according to the part of the predetermined code value.

In accordance with an additional aspect of the present invention, a mobile terminal is provided for unlocking in stages. The mobile terminal includes a controller for counting an amount of time since setting a locking mode. The mobile terminal also includes a touch screen for receiving an unlocking command from a user and outputting an unlocking screen for a locking stage corresponding to the amount of time from among a plurality of locking stages. The controller compares an unlocking command received through the unlocking screen and an unlocking command of a determined locking stage, and releases the locking mode when the unlocking command received through the unlocking screen is identical to the unlocking command in the determined locking stage.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF EMBODIMENTS OF THE PRESENT INVENTION

Embodiments of the present invention are described in detail with reference to the accompanying drawings. The same or similar component may be designated by the same or similar reference numerals although they are illustrated in different drawings. Detailed descriptions of constructions or processes known in the art may be omitted to avoid obscuring the subject matter of the present invention.

Embodiments of the present invention provide a method to more conveniently release a locking function. Specifically, embodiments of the present invention divide the unlocking of a mobile terminal into stages, count a standby time from a time of a final user input for the mobile terminal, switch a current state of the mobile terminal to a locking state when the counted standby time exceeds a predetermined time, set a locking stage based on the standby time until an unlocking command is input, determine whether an unlocking command corresponding to the set locking stage corresponds to the input unlocking command when the unlocking command is input, and release the locking when the unlocking command corresponding to the set locking stage corresponds to an input unlocking command. Embodiments of the present invention automatically change the locking method from a simple method of unlocking to a complex method of unlocking, so that a user may conveniently perform an unlocking operation and security enhancement of the mobile terminal may also be achieved.

Figure 1:
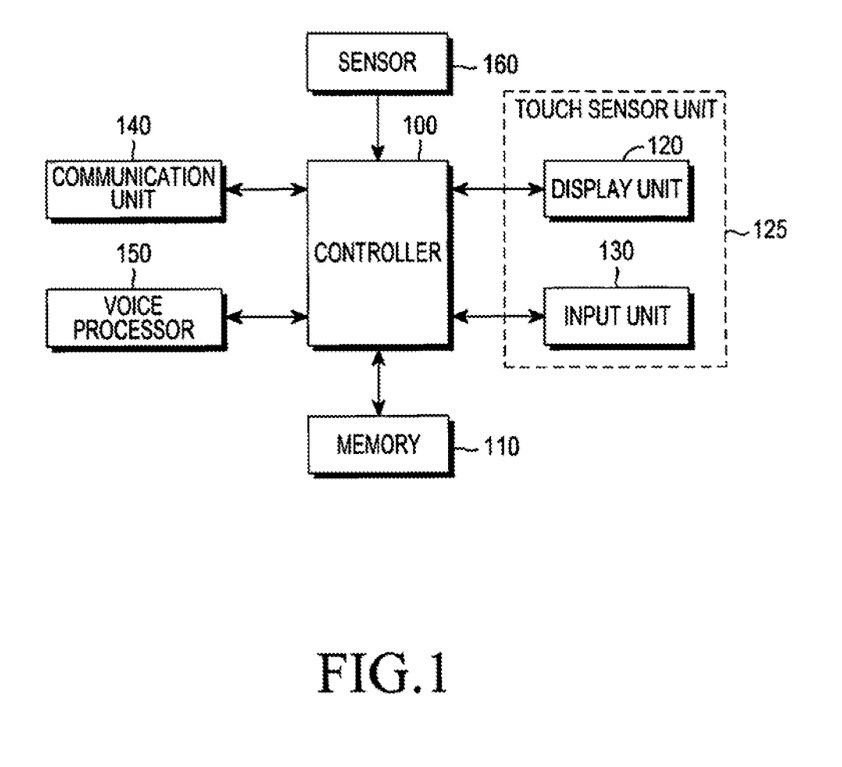
FIG. 1 is a block diagram illustrating a mobile terminal for an unlocking in stages, according to an embodiment of the present invention.

FIG. 1 is a block diagram illustrating a mobile terminal for unlocking in stages, according to an embodiment of the present invention.

Referring to FIG. 1, the mobile terminal includes a controller 100, a memory 110, a display unit 120, an input unit 130, a communication unit 140, a voice processor 150, and a sensor 160. The mobile terminal of the present invention is not necessarily limited to the aforementioned construction. Further, an example of the mobile terminal, according to the embodiment of the present invention, may include any device, such as, for example, a personal computer, a notebook computer, a digital sound resource reproducing device, or a Portable Multimedia Player (PMP), in addition to a mobile phone capable of performing communication, requiring user locking.

The memory 110 stores various data generated and utilized in the mobile terminal. The data includes data generated according to the execution of an application of the mobile terminal, or any type of storable data generated using the mobile terminal or received from the outside. The data, according to an embodiment of the present invention, may include a UI provided in the mobile terminal, setting information according to the use of the mobile terminal, and information related to a locking stage setting using a standby time. The information related to the locking stage setting includes a number of unlocking stages, an input standby time for each stage, the same method of unlocking for each stage, and different methods of unlocking for each stage.

The display unit 120 may be embodied as a Liquid Crystal Display (LCD), and displays a menu, input data, function setting information, and other information. When the mobile terminal turns on in the locking mode according to the control, the display unit 120 displays an unlocking screen according to a standby time elapsed after the locking mode. Specifically, the display unit 120 displays the unlocking screen, discriminated for each stage in accordance with the elapsed standby time.

The input unit 130 includes a hardware keyboard, including multiple numbers and character keys for receiving input of a command from a user. The display unit 120 and the input unit 130 may be implemented as a touch screen 125. In this case, the input unit 130 detects a touch input of a user through a virtual keyboard displayed on the touch screen 125, and transfers a result of the detection to the controller 100. The input unit 130 generates a touch event corresponding to an unlocking command having a predetermined code value when a screen related to the unlocking of the mobile terminal is output on the touch screen 125, and transfers the generated touch event to the controller 100. The unlocking command having the predetermined code value includes, for example, a drag signal for inputting a predetermined pattern and touched keys corresponding to a password.

The communication unit 140 transmits/receives a voice signal necessary for a call function and data necessary for data communication under the control of the controller 100.

The voice processor 150 converts voice data to audible sound, outputs the audible sound through a speaker, converts a voice signal received from a microphone to data, and outputs the converted data. The voice processor 150 outputs a voice signal for recognizing a voice of a user as a command for the unlocking.

The sensor 160 includes various sensors. The various sensors include, for example, a Global Positioning System (GPS), a geomagnetic sensor, and/or an accelerometer. The various sensors generate specific signals according to, for example, movements of the mobile terminal. The sensor 160 outputs the specific signals generated by the various sensors to the controller 100, and the controller 100 may discriminate motions including, for example, a tilt, a shake, and a snap, of the mobile terminal based on the specific signals. The sensor 160 may then determine an unlocking command corresponding to a motion. The specific signal generated by the GPS may be used for a position-based unlocking.

The controller 100 performs a general control function for the mobile terminal and controls a signal flow between the aforementioned elements. Specifically, the controller 100 converts the current mode of the mobile terminal to the locking mode, and detects a touch of a user by controlling the input unit 130, according to an embodiment of the present invention. Accordingly, the control unit 100 determines whether to perform the unlocking in accordance with the unlocking command by recognizing the unlocking command, such as, for example, an input pattern of a movement at a touched position or input keys corresponding to the touched position. The controller 100 controls the display unit 120 so as to provide the UI corresponding to the recognized pattern of the movement at the touched position.

The controller 100 may control a general operation of the present invention as described below with reference to FIGS. 2 to 8. The control of the controller 100 may be implemented with software to process the operation of embodiments of the present invention.

A method of setting an unlocking in stages, according to an embodiment of the present invention, is described below with reference to FIG. 2.

Figure 2:
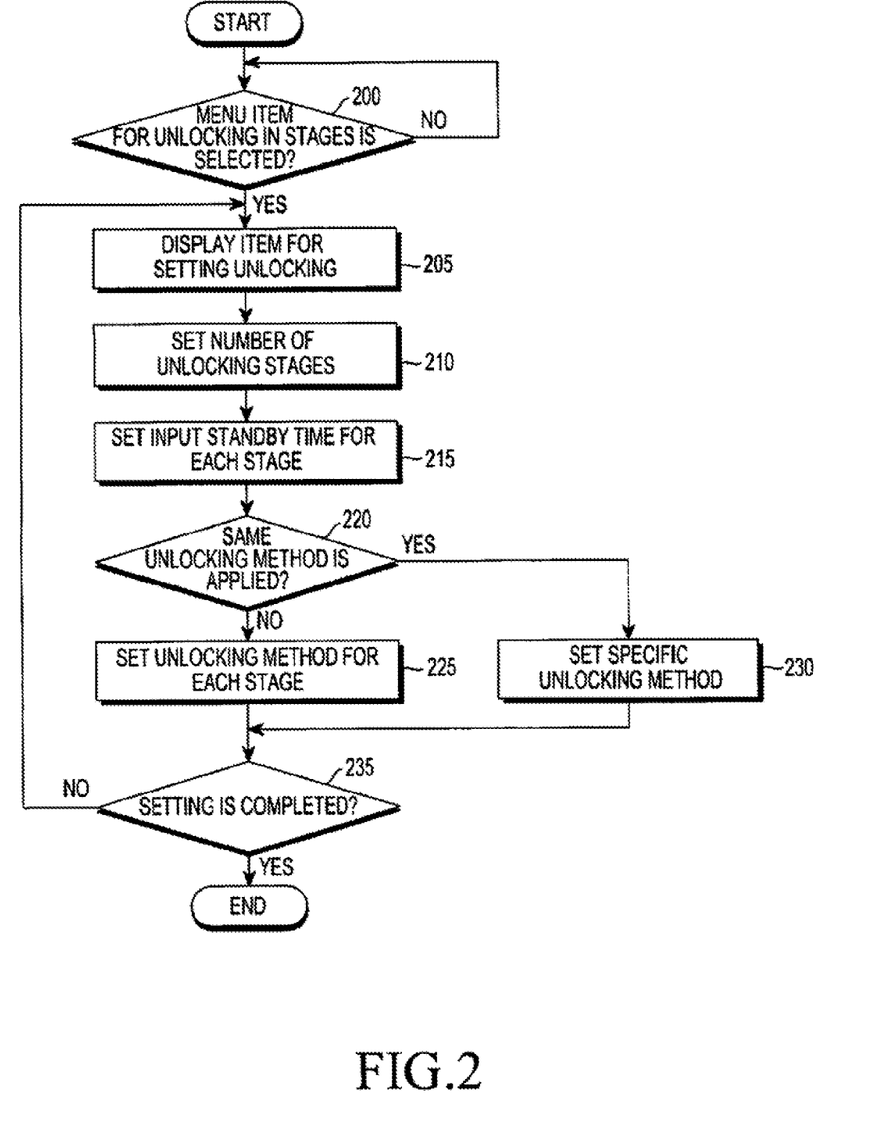
FIG. 2 is a flowchart illustrating a method of setting an unlocking in stages, according to an embodiment of the present invention.

Referring to FIG. 2, a user may set a locking/unlocking function of the mobile terminal by selecting an item related to the locking mode from among various items of a setting menu provided in the mobile terminal.

Figure 3:
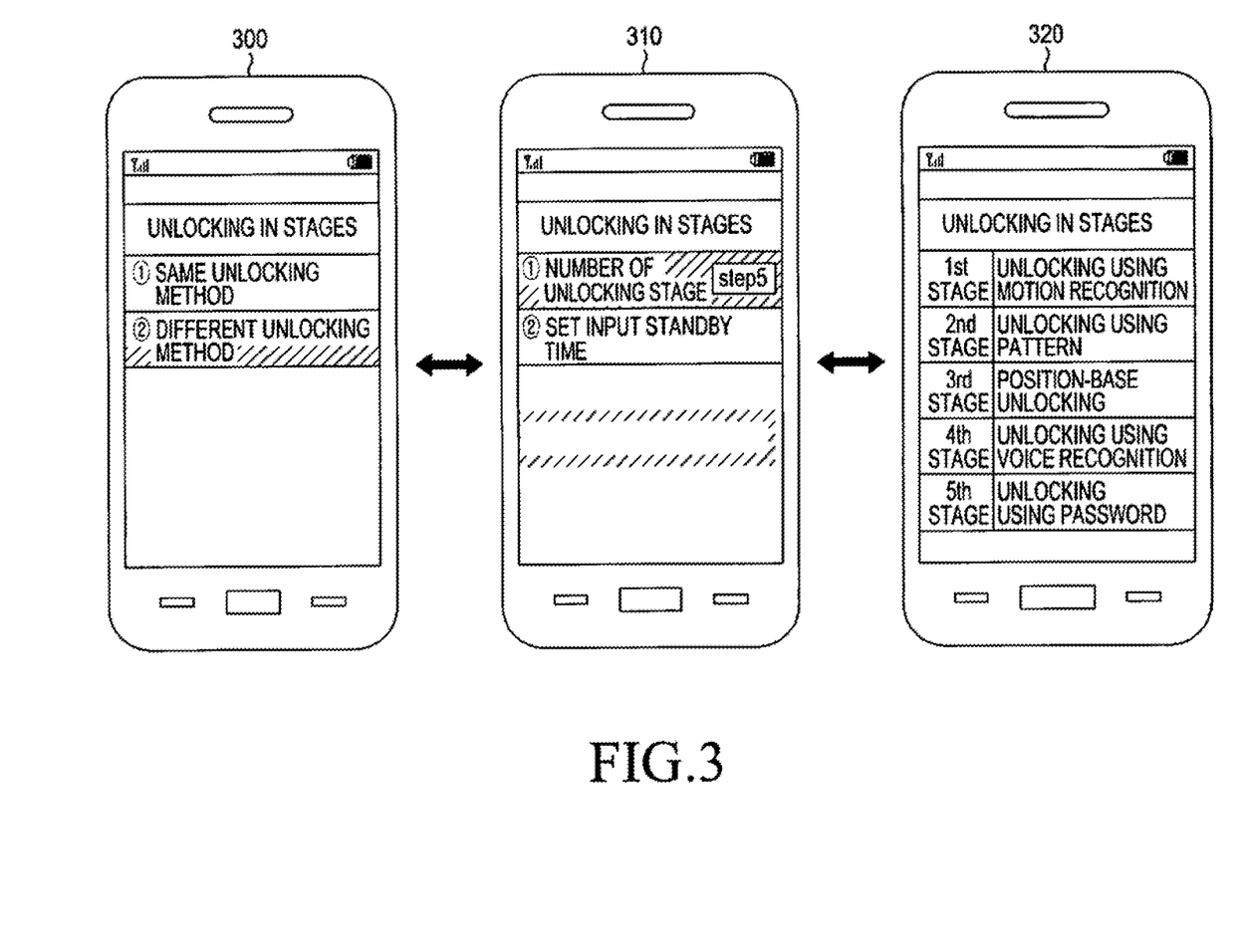
FIG. 3 illustrates a mobile terminal setting unlocking in stages, according to an embodiment of the present invention.

The mobile terminal determines whether an item of the unlocking in stages is selected by a user, in step 200. When the item of the unlocking in stages is selected, the mobile terminal displays items related to an unlocking setting, in step 205. For example, as illustrated in FIG. 3, the items related to the unlocking setting may be embodied as, for example, an item for setting the number of unlocking stages, in which the number of unlocking stages may be set, an item for setting an input standby time, in which a time for waiting for an input of an unlocking command may be set for each locking stage, and an item for setting the same or different methods of unlocking for each stage. The user may set the unlocking information by selecting a desired item from among the aforementioned items. Values preset in the mobile terminal may be applied to the items, when the user does not separately set the total number of unlocking stages, for example.

Accordingly, the mobile terminal receives the setting of the number of unlocking stages from the user through a screen 310 of FIG. 3, in step 210. The mobile terminal then receives a setting of an input standby time for each stage, in step 215. The mobile terminal may automatically set the number of unlocking stages and the input standby time when the user does not separately set the number of unlocking stages and the standby time. Further, the user may set the same or different methods of unlocking for each unlocking stage, based on a screen 300 of FIG. 3.

Referring back to FIG. 2, it is determined whether the same method of locking is applied, in step 220. When the same method of unlocking is not applied, the mobile terminal may receive user settings of the different methods of unlocking for each stage as shown in a screen 320 of FIG. 3, in step 225. The screen 320 of FIG. 3, for setting the unlocking in stages is an example of a case in which the unlocking stage is set in a total of five stages. The five stages include a first stage of an unlocking through a recognition of a motion of the mobile terminal, a second stage of a pattern unlocking, a third stage of a position-based unlocking, a fourth stage of an unlocking through a voice recognition, and a fifth stage of a password unlocking. The method of unlocking through the motion recognition, through the voice recognition, or based on the position may be used for unlocking in a relatively low stage, and a complex password or pattern is preferably applied to the unlocking in a higher stage. However, the different type of unlocking method for each stage is selectable by the user.

The method of unlocking through the recognition of the motion of the mobile terminal is a method of releasing the locking through a motion of the mobile terminal, which is set by the user in advance. The method of unlocking based on a position is a method in which, based upon a current position, the more often a user stays at a place, the shorter a length of an input unlocking command is.

Figure 4A:
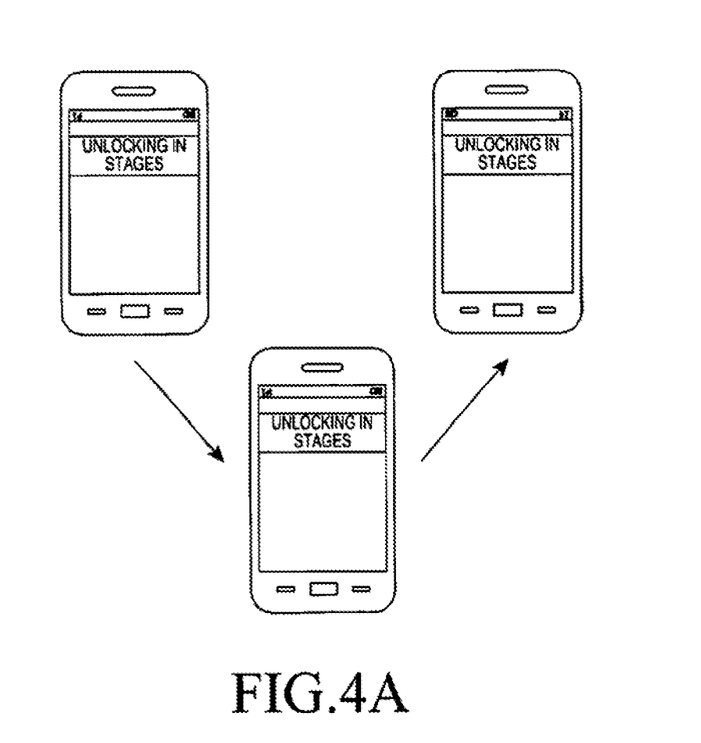
FIG. 4A-4C illustrate a method of unlocking in stages, according to an embodiment of the present invention.
Figure 4B:
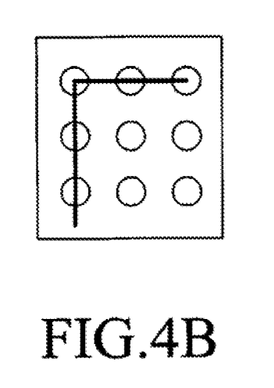
Figure 4C:
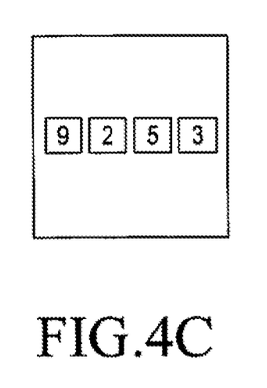

For example, FIG. 4A illustrates a method of unlocking in which the user draws the V sign while holding the mobile terminal, according to an embodiment of the present invention. FIG. 4B illustrates an example of the method of unlocking by inputting a pattern through a movement of a touch position by the user, according to an embodiment of the present invention. FIG. 4C illustrates an example of the method of unlocking by inputting a password, according to an embodiment of the present invention.

The locking in the first stage may be performed when a standby time for an input from the user exceeds 30 seconds. The locking in the second stage may be performed after one minute from the time of the locking in the first stage. The locking in the third stage may be performed after one minute from the time of the locking in the second stage. When the user performs a specific input for re-use of the mobile terminal, the mobile terminal checks its locking state. When the specific input is performed after the input from the user exceeds 30 seconds, the mobile terminal outputs a first-stage unlocking screen. When the user draws the V sign using the mobile terminal, the locking state may be released and the user may use the mobile terminal. However, when the specific input is performed after one minute from the setting of the locking in the first stage, the mobile terminal outputs a second-stage unlocking screen. Specifically, the mobile terminal outputs a screen for an input of the pattern. When the specific input is performed after a time corresponding to the setting of the second stage elapses, the mobile terminal outputs a third-stage unlocking screen. Accordingly, when the mobile terminal displays a screen for an input of a four-digit password as illustrated in FIG. 4C, the user may use the mobile terminal only by inputting a four-digit password. The password is a code value including a combination of a series of numbers.

Referring back to FIG. 2, when the application of the same method of unlocking is selected in step 220, the mobile terminal sets the same method of unlocking selected by the user for each stage, in step 230. For example, when the user selects the method of unlocking using the pattern for the highest stage, the method of unlocking using the pattern is automatically set for all stages.

With respect to the method of unlocking using the pattern, as the stage becomes higher, a length of an input part of a predetermined pattern becomes longer. A length of a pattern for each stage may be discriminated based on a time of stoppage during the drawing of the pattern with a hand of the user. For example, when the user draws an N-shape pattern, whenever a holding state is maintained after the drag from an initial touch input position, the pattern drawn up to that time is mapped to each stage. Otherwise, a length of a pattern for each stage may be determined by discriminating the entire patterns for each vertex.

In a similar manner, with respect to the method of unlocking using the password, as the locking stage becomes higher, a length of an input value of the code value to be input increases. Specifically, whenever the stage becomes higher, the number of password digits to be input in the complete password by the user increases one by one.

Referring back to FIG. 2, it is determined whether the setting is completed, in step 235. When the setting is not completed, the methodology returns to step 205 to display the item for setting the unlocking. When the setting is completed through the aforementioned process, the process according to the selection of the menu item for the unlocking in stages is completed. An order of the operations from step 210 to step 230 may be changed according to the selection of the menu item by the user. The order of the operations, such as, for example, the setting of the locking method, the setting of the standby time, and the setting of the number of stages, is not limited to the order of FIG. 2, and may be changed or omitted according to the selection of the user.

Figure 5:
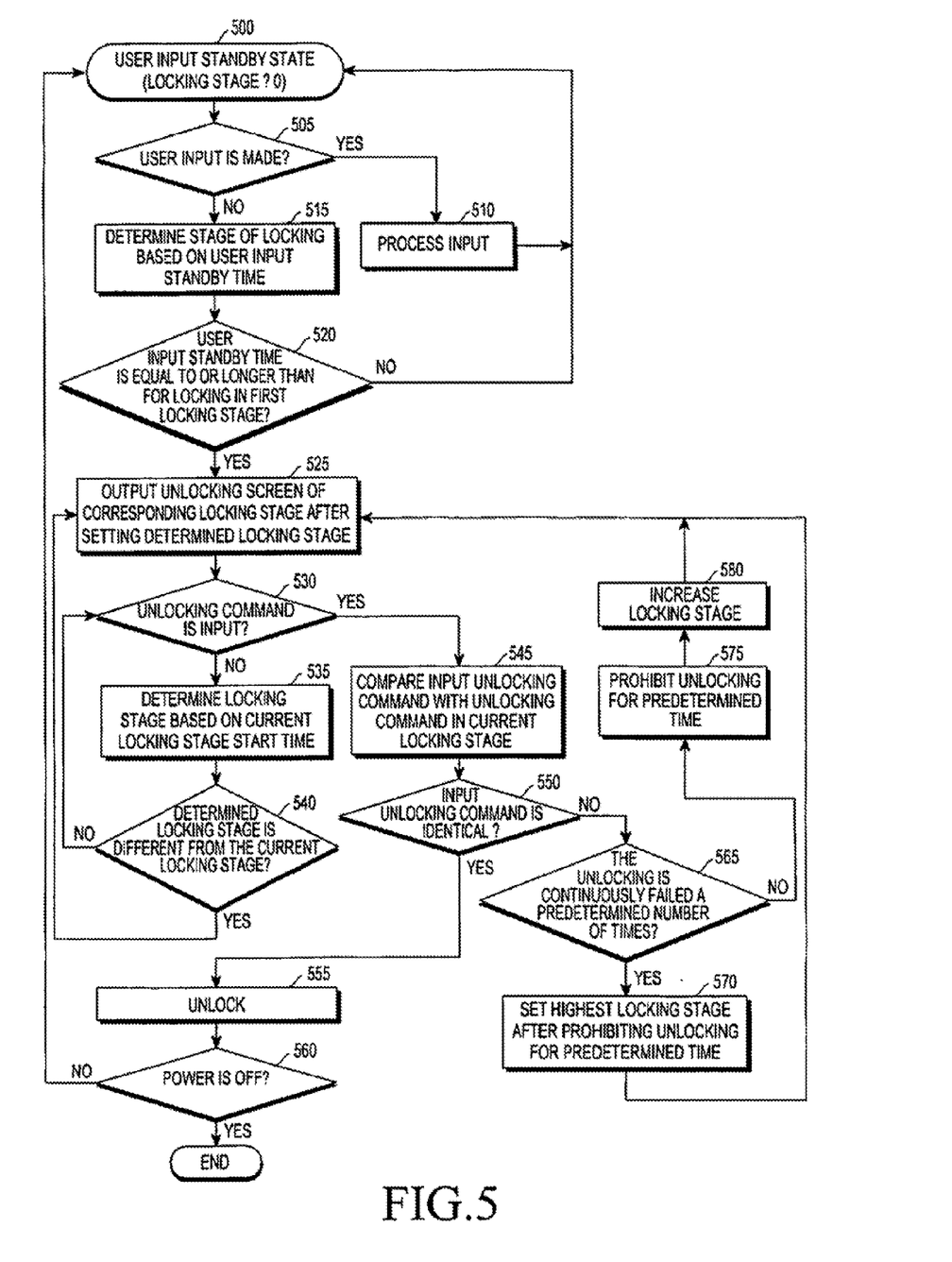
FIG. 5 is a flowchart illustrating a method of unlocking in stages in a mobile terminal, according to an embodiment of the present invention.

FIG. 5 is a flowchart illustrating the method of unlocking in stages in the mobile terminal, according to an embodiment of the present invention. The embodiment of FIG. 5 is based on a premise that in a state where the function of the mobile terminal is performed by releasing the locking state of the mobile terminal according to an input unlocking command, the mobile terminal is in a user input standby state before the re-locking of the screen after a final input from the user. Further, the method of unlocking is described with reference to FIGS. 6 and 7, but the method of unlocking according to the present invention is not limited thereto.

Referring to FIG. 5, the mobile terminal is in a standby state, waiting for input from a user, in step 500. The mobile terminal determines whether the input of the user is made, in step 505. A locking stage in the user input standby state is a zero-stage, and the mobile terminal counts a user input standby time from a time of a final input of the user. When the input of the user is made, the mobile terminal processes the input of the user, in step 510. For example, the mobile terminal may display a set screen or maintain a display screen according to the input of the user. The methodology then returns to the standby state of step 500.

Figure 8:
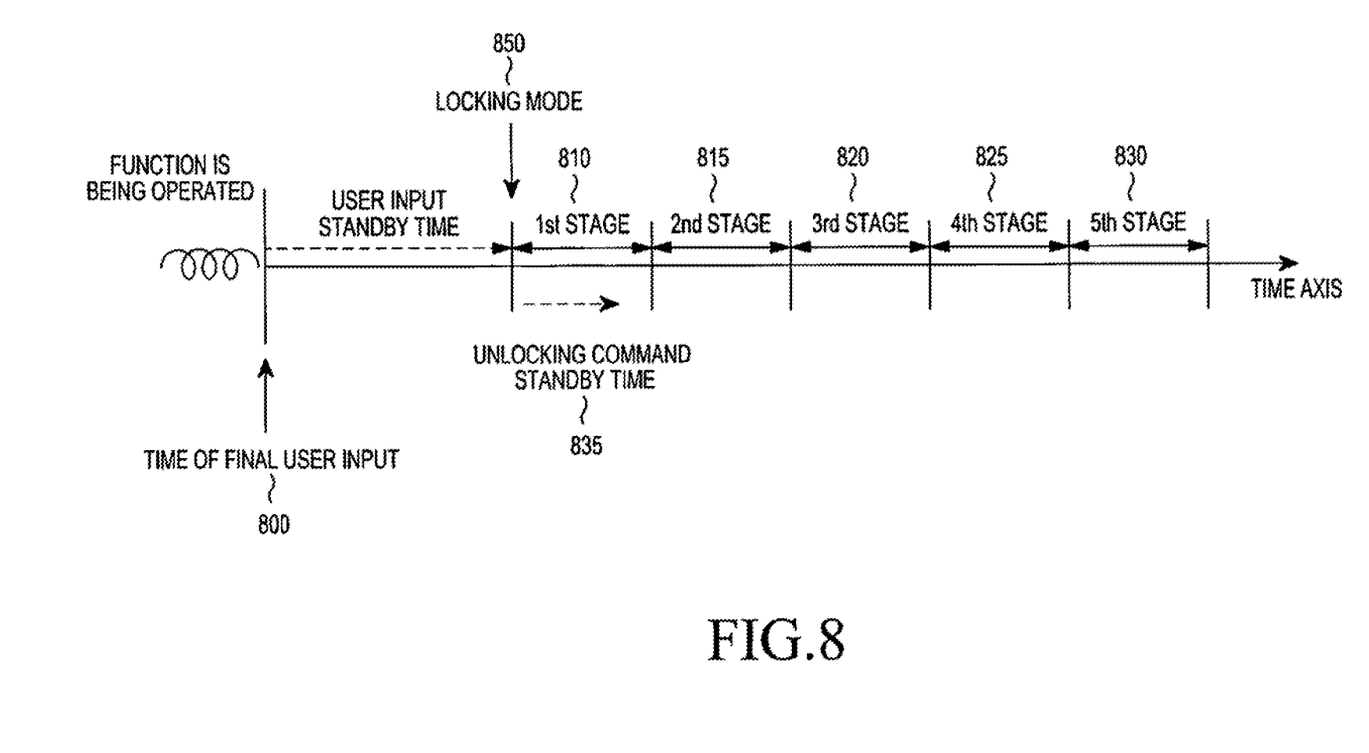
FIG. 8 illustrates a locking stage according to time passage, according to an embodiment of the present invention.

The locking stages are described in detail with reference to FIG. 8. FIG. 8 illustrates an example of the locking stages as time lapses, according to an embodiment of the present invention. In FIG. 8, a horizontal axis is a time axis. Referring to FIG. 8, a locking mode 850 is set when a predetermined time elapses after a final user input 800. The locking mode of a second stage 815 is set when a predetermined time 835 elapses after the setting of the locking mode 850 in a first stage 810. Locking modes in a third stage 820, a fourth stage 825, and a fifth stage 830 are sequentially changed as a predetermined time lapses. When it is assumed that the locking mode 850 in the first stage begins after 30 seconds from the time of the final user input 800, the locking stage may be the zero-stage when the user input standby time is within 30 seconds. However, the locking stage is changed to the first stage when the user input standby time exceeds 30 seconds. When one minute elapses after the initiation of the locking mode 850 in the first stage 810, the locking mode in the second stage 815 is set. Accordingly, as a difference between input times of the part of the predetermined pattern increases, a size of the input part of the predetermined pattern increases.

Referring back to FIG. 5, when it is determined that there is no input from the user in step 505, the mobile terminal determines the locking stage based on the user input standby time, in step 515. For example, when the counted user input standby time is within 30 seconds, the locking stage corresponds to the zero stage and the mobile terminal is in a state of non-activation of the locking mode. The mobile terminal determines whether the user input standby time is greater than or equal to the time for the first locking stage, in step 520. When the user input standby time is less than the time for the first locking stage, the mobile terminal returns to step 500, where it is determined whether an input of the user is made. When the user input standby time is greater than or equal to the time of the first locking stage, the terminal sets a locking stage to the determined locking stage and outputs an unlocking screen corresponding to the set locking stage.

When the display unit is in an off state due to a screen saver mode before the output of the unlocking screen, the display unit is put in an on-state when a specific input for turning on the display unit is made and the unlocking screen corresponding to the currently determined locking stage is output. For example, when the user input standby time exceeds 30 seconds, the locking mode 850 is set, as shown in FIG. 8. Accordingly, when the display unit is in the on-state, the unlocking screen corresponding to the locking mode in the first stage is set.

The mobile terminal determines whether an unlocking command is input, through a first-stage unlocking screen, in step 530. When the unlocking command is not input, the mobile terminal determines the locking stage based on a current locking stage initiation time, in step 535. For example, when the locking mode in the first stage is initiated, the mobile terminal counts the standby time from the first locking stage initiation time. The current locking stage initiation time is 30 seconds, and the locking mode in the second stage 815 is set when one minute elapses from the current locking stage initiation time. The mobile terminal determines a stage to which a time counted from the current locking stage initiation time belongs. The time counted from the current locking stage initiation time has the same meaning as the standby time for the input of the unlocking command.

Accordingly, the mobile terminal determines whether the determined locking stage is different from the current locking stage, in step 540. For example, when the current locking stage is the first stage, but it is determined that the time counted from the current locking stage initiation time belongs to the second locking stage, the determined locking stage is different from the locking mode in the current stage. When it is determined that the determined locking stage is the same as the current locking stage because the time counted from the current locking stage initiation time still belongs to the first locking stage, the mobile terminal returns to step 530 in order to determine whether the unlocking command is input. However, when the determined locking stage is different from the current locking stage, the mobile terminal sets the determined locking stage and then outputs an unlocking screen corresponding to the set locking stage. Accordingly, the unlocking screen corresponding to the second locking stage is output.

When the unlocking command is not input in step 530, the mobile terminal counts a time from a second stage initiation time, in step 535. When it is determined that the counted time belongs to the third locking stage, the mobile terminal returns to step 525 and repetitively performs the aforementioned processes. When the unlocking command is not received even though the locking stage becomes high, the mobile terminal outputs an unlocking screen corresponding to the increased locking stage. Specifically, as the input of the unlocking command from the user is delayed, the locking stage increases and the length of the unlocking command to be input increases, so that the security level is enhanced.

When the unlocking command is input in a state where the unlocking screen corresponding to the set locking stage is output in step 530, the mobile terminal compares the unlocking command in the current locking stage and the input unlocking command, in step 545. The mobile terminal determines whether the unlocking command in the current locking stage is the same as the input unlocking command, in step 550. When the unlocking command in the current locking stage is the same as the input unlocking command, the mobile terminal releases the locking in step 555, and returns to step 500 and repetitively performs the aforementioned processes unless it is determined that the power is off in step 560.

An example of the unlocking screen for each locking stage is illustrated with reference to FIGS. 6 and 7, according to an embodiment of the present invention.

Figure 6:
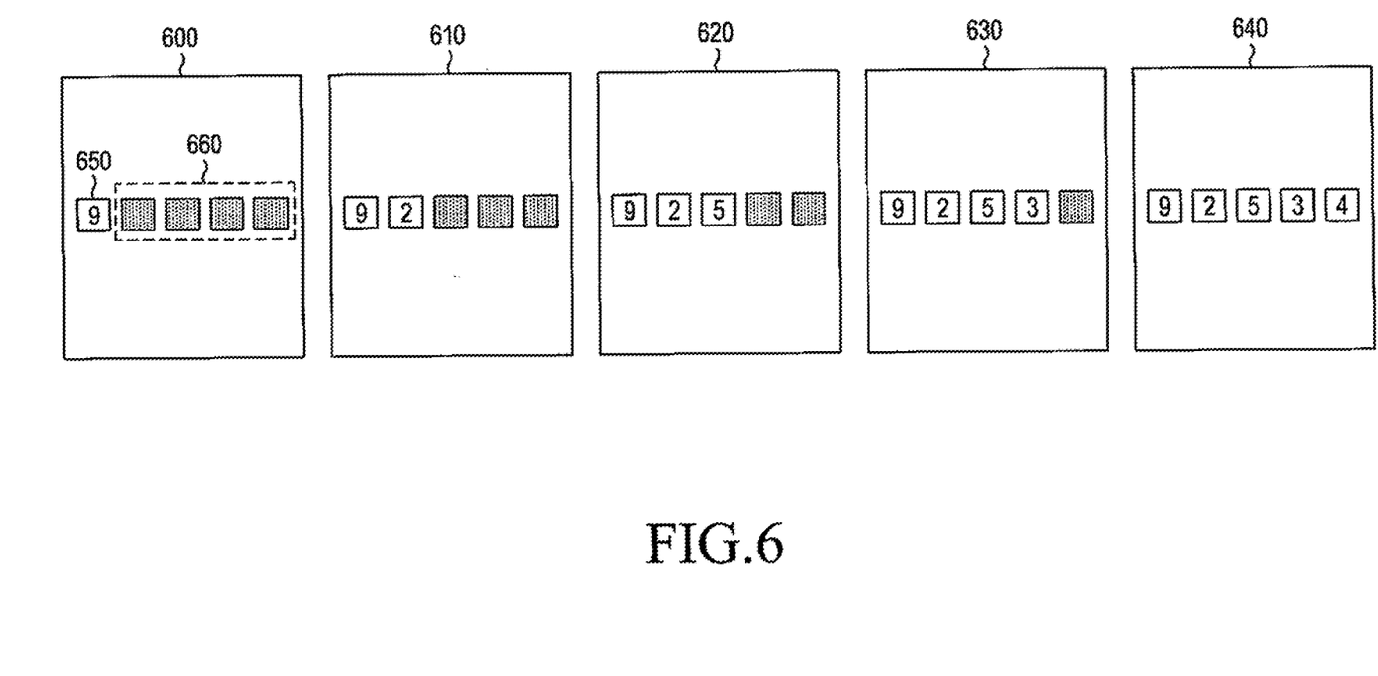
FIG. 6 illustrates a screen showing a method of unlocking using a password, according to an embodiment of the present invention.

FIG. 6 illustrates a screen for the method of unlocking using a password, in which a preset code value is a combination of a series of numbers and the number of stages of the locking is 5. Referring to FIG. 6, a screen 600 corresponds to a first-stage unlocking screen. Information on the locking stage may be displayed on the unlocking screen such that the user may intuitively recognize the locking stage. The information on the locking stage may contain information indicating numbers such that the user may easily identify information on the locking state of the mobile terminal. Otherwise, one input window 650 among input windows for a 5-digit password is displayed in an activation state, and the remaining input windows 600 are displayed in an inactivation state, so that the user may identify the locking stage. The user may be intuitively aware of a necessity of the input of the password corresponding to the designated number of the activated input windows. Although FIG. 6 illustrates an example of a case in which as the locking stage increases, the number of input windows is increased and activated one by one. However, it is a matter of course that when all digits of the password are set for the highest stage, the number of digits of the input value to be input for each stage may be changed.

As described above, the user is required to input the first two digits of the password for a second stage unlocking, the first three digits of the password for a third stage unlocking, the first four digits of the password for a fourth stage unlocking, and all five digits of the password for a fifth stage unlocking. When the locking stage is increased according to the aforementioned method, the unlocking screen is changed from the screen 600 to a screen 640. Accordingly, since it is sufficient for the user to input a part of the input value even without repetitively inputting the entire code value in the locking mode state each time in order to activate a currently used function, the present invention has an effect of reducing inconvenience while maintaining the security of the mobile terminal. For example, when the user reads an e-book, it is sufficient for the user to input only a short input value whenever the mobile terminal is converted to the locking mode due to a lack of touch input during the reading of the e-book, so that it is possible to rapidly release the locking and increase the user's convenience.

Figure 7:
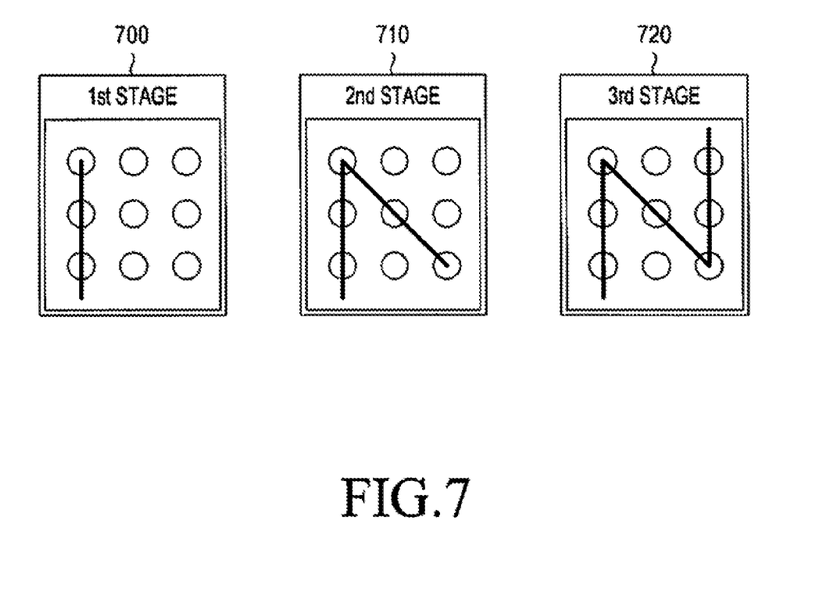
FIG. 7 illustrates a screen showing a method of unlocking using a pattern, according to an embodiment of the present invention.

FIG. 7 illustrates the method of unlocking using the pattern in which a predetermined code value is a pattern drawn, according to a touch input of the user. The number of locking stages is three. Referring to FIG. 7, a shape of the entire pattern for the third locking stage that is the highest locking stage is set as denoted with reference numeral 720. A screen 700 in the first stage shows a part of the predetermined pattern input up to a first vertex, and a screen 710 in the second stage shows a part of the predetermined pattern input up to a second vertex. As described above, the mobile terminal determines whether to release the locking by analyzing the pattern of a movement from a touch position by the user and determining whether a part of the predetermined pattern corresponding to the locking stage is input. The mobile terminal may analyze the pattern according to the method provided below. For example, a pattern to be input for each locking stage may be determined by dividing the entire pattern based on a vertex, and setting a pattern up to the first vertex as the first stage, setting a pattern up to the second vertex as the second stage, setting a pattern up to the $n^{th}$ vertex as the $n^{th}$ stage, and setting a pattern up to a moment of taking the hand off the screen as the $(n+1)^{th}$ stage. Otherwise, a pattern to be input for each locking stage may be determined by setting a pattern, which has been drawn up to a time before a holding state is maintained for a predetermined time without taking the hand off the screen during the drawing of the pattern by the user, as one stage.

Referring back to FIG. 5, when the unlocking command in the current locking stage is not the same as the input unlocking command as a result of the comparison of step 550, the mobile terminal determines whether the unlocking has continuously failed a predetermined number of times, in step 565. Specifically, the mobile terminal determines whether a situation in which the unlocking command input by the user is not the same as the unlocking command in the current locking stage has occurred a predetermined number of times. As a result of the determination, when the unlocking is continuously failed the predetermined number of times, the mobile terminal prohibits the unlocking for a predetermined time and then sets the locking stage to the highest stage, in step 570. The predetermined time of step 570 is longer than a predetermined time of step 575, but the mobile terminal may immediately set the locking stage to the highest stage without waiting the predetermined time. The mobile terminal then proceeds to step 525 to output an unlocking screen corresponding to the highest stage. As described above, when the number of failures according to the result of the comparison reaches the predetermined number of times, this may indicate that the mobile terminal has been stolen, so the locking stage is set to the highest stage.

When the unlocking command in the current locking stage is not the same as the input unlocking command in step 550 but the unlocking has not continuously failed the predetermined number of times in step 565, the mobile terminal prohibits unlocking for the predetermined time, in step 575, and then increases the locking stage, in step 580. The mobile terminal then proceeds to step 525 to output an unlocking screen corresponding to the increased locking stage. As described above, as the number of cases where the unlocking command in the current locking stage is not the same as the input unlocking command increases, the locking stage is sequentially increased. When the unlocking command input from the user is not the same as the unlocking command in the current locking stage, the mobile terminal ignores the touch input for the unlocking input for a predetermined time, and then outputs an unlocking screen corresponding to a next stage after the predetermined time.

In the foregoing description, when the user input is not made for the predetermined time, the mobile terminal enters the locking mode. However, pressing a screen locking button of the mobile terminal may also initiate the locking mode. When the user presses the screen locking button through a configuration menu, the user may select any one of a method in which the mobile terminal immediately converts a current locking mode to the current locking stage, a method in which the mobile terminal converts a current locking mode to the locking mode of the highest stage, and a method in which the mobile terminal simply turns off the screen without the actual locking. Accordingly, when the screen locking button is pressed, the mobile terminal waits for user input while turning off only the screen, or executes the current locking stage or the locking mode of the highest stage, according to the setting of the user.

Accordingly, the present invention automatically changes from the simple method of unlocking by simply releasing the locking function to the complex method of unlocking in stages according to increasing standby time, so that the user may conveniently release the locking function and the security of the mobile terminal may be enhanced.

Further, according to an embodiment of the present invention, the user may selectively set the method of unlocking and the input standby time for each stage of the locking function, so that the user may more efficiently use the mobile terminal. Furthermore, the embodiments of the present invention provide information on the unlocking in the current stage and the method of unlocking through an idle screen for the unlocking of the mobile terminal, so that the user may intuitively recognize the security stage.

It is appreciated by those of ordinary skill in the art that the embodiments of the present invention may be embodied in software, hardware, or a combination of hardware and software. The software may be stored in a volatile or non-volatile storage device including a Read Only Memory (ROM), a memory including a Random Access Memory (RAM), a memory chip, a device, and an integrated circuit, or optical or magnetically recordable and simultaneously machine-readable storage medium including a Compact Disc (CD), a Digital Video Disc (DVD), a magnetic disk, or a magnetic tape, regardless of a deletable function or a rewritable function. It is also appreciated that the memory includable in the mobile terminal is one example of machine readable storage mediums appropriate for storing a program or programs including instructions for implementing the embodiments of the present invention. Accordingly, embodiments of the present invention include a program having codes for implementing the apparatus or the method defined in any claim of the present specification and a machine (computer, etc.) readable storage media for storing the program. Further, the program may be electronically transferred through predetermined media, such as a communication signal transferred through wired or wireless connection and embodiments of the present invention appropriately includes equivalents thereof.

While the invention has been shown and described with reference to certain embodiments thereof, it will be understood by those skilled in the art that various changes in form and detail may be made therein without departing from the spirit and scope of the invention as defined by the appended claims.

What is claimed is:

1. A method of unlocking in stages in a mobile terminal, the method comprising the steps of:
    counting an amount of time since setting a locking mode;
    receiving an unlocking command from a user;
    determining a locking stage based on the amount of time from among a plurality of locking stages;
    comparing an unlocking command of the determined locking stage and the received unlocking command; and
    releasing the locking mode when the unlocking command in the determined locking stage is identical to the received unlocking command;
    wherein a length of the unlocking command in the determined locking stage increases as the amount of time increases.

2. The method as claimed in claim 1, further comprising:
    determining whether the unlocking command is received during a standby time;
    determining the locking stage based on the amount of time, when the unlocking command is not received during the standby time; and
    outputting an unlocking screen corresponding to the determined locking stage.

3. The method as claimed in claim 1, wherein an unlocking command of a highest locking stage from among the plurality of locking stages is a series of code values set by a user or a predetermined pattern.

4. The method as claimed in claim 3, wherein as the locking stage increases, a number of input values to be input among the series of code values increases.

5. The method as claimed in claim 3, wherein as the locking stage increases, a length of a part of the predetermined pattern to be input increases.

6. The method as claimed in claim 1, further comprising:
    displaying menu items related to setting of the plurality of locking stages, when a menu item for setting the locking stage is selected; and
    setting a same unlocking scheme or different unlocking schemes for each of the plurality of locking stages according to user input.

7. The method as claimed in claim 6, wherein the different unlocking schemes comprise at least one of an unlocking scheme using a password, an unlocking scheme using a position of the mobile terminal, an unlocking scheme using a predetermined pattern, and an unlocking scheme using a motion of the mobile terminal.

8. The method as claimed in claim 6, wherein the setting the same unlocking scheme for each of the plurality of locking stages comprises setting an unlocking scheme for a highest locking stage among the plurality of locking stages, and setting the same unlocking scheme for remaining locking stages of the plurality of locking stages.

9. The method as claimed in claim 1, further comprising:
    counting a standby time since a final user input; and
    setting the locking mode, when the standby time since the final user input exceeds a predetermined time.

10. A method of unlocking in stages in a mobile terminal, the method comprising the steps of:
    receiving an unlocking command of a predetermined code value;
    releasing a locking state of the mobile terminal according to the unlocking command;
    counting a user input standby time;
    converting a state of the mobile terminal to a re-locking state when the user input standby time exceeds a predetermined time;
    receiving a part of the predetermined code value corresponding to the unlocking command;
    releasing the locking state of the mobile terminal according to the part of the predetermined code value;
    wherein, in the re-locking state, as a time to input of the part of the code value increases, a size of the part of the code value to be input increases.

11. The method as claimed in claim 10, wherein the predetermined code value includes a combination of a series of numbers or a pattern drawn according to a touch input of a user.

12. The method as claimed in claim 10, further comprising determining whether the part of the code value input for releasing the locking state of the mobile terminal is equal to a code value corresponding to the determined locking stage.

13. The method as claimed in claim 10, wherein receiving the part of the predetermined code value corresponding to the unlocking command comprises receiving the entire code value corresponding to the unlocking command when the determined locking stage is a highest locking stage.

14. A mobile terminal for unlocking in stages comprising:
    a controller for counting an amount of time since setting a locking mode; and
    a touch screen for receiving an unlocking command from a user and outputting an unlocking screen for a locking stage corresponding to the amount of time from among a plurality of locking stages,
    wherein the controller compares an unlocking command received through the unlocking screen and an unlocking command of a determined locking stage, and releases the locking mode when the unlocking command received through the unlocking screen is identical to the unlocking command in the determined locking stage, and
    wherein a length of the unlocking command in the determined locking stage increases as the amount of time increases.

15. The mobile terminal as claimed in claim 14, wherein an unlocking command of a highest locking stage from among the plurality of locking stages is a series of code values set by a user or a predetermined pattern.

16. The mobile terminal as claimed in claim 15, wherein as the locking stage increases, a number of input values to be input among the series of code values increases.

17. The mobile terminal as claimed in claim 15, wherein as the locking stage increases, a length of a part of the predetermined pattern to be input increases.

* * * * *